(12) United States Patent
Armo

(10) Patent No.: US 6,464,194 B1
(45) Date of Patent: Oct. 15, 2002

(54) SLIDE RAIL FOR A VEHICLE CHAIR

(75) Inventor: Sverker Armo, Eskilstuna (SE)

(73) Assignee: Volvo Wheel Loaders AB, Eskilstuna (SE)

( * ) Notice: Subject to any disclaimer, the term of this patent is extended or adjusted under 35 U.S.C. 154(b) by 0 days.

(21) Appl. No.: 09/649,045

(22) Filed: Aug. 29, 2000

(30) Foreign Application Priority Data

Sep. 2, 1999 (SE) ................................................ 9903102

(51) Int. Cl.[7] ................................................ F16M 13/00
(52) U.S. Cl. ...................................................... 248/430
(58) Field of Search ................................ 248/429, 424, 248/430

(56) References Cited

U.S. PATENT DOCUMENTS 4,262,963 A    4/1981  Bauer et al. ............ 248/429 X
RE35,485 E  * 4/1997  Stewart ...................... 248/429
5,620,161 A * 4/1997  Wisner et al. .............. 248/429

FOREIGN PATENT DOCUMENTS

EP        0 421 300        4/1991
EP        0 842 807        5/1998

* cited by examiner

*Primary Examiner*—Ramon O. Ramirez
(74) *Attorney, Agent, or Firm*—Young & Thompson

(57) ABSTRACT

A slide rail arrangement for a vehicle seat, includes an elongated guide rail, intended to be fixed relative to a vehicle floor, and a slide rail, which has an upside down U-profile and spans over the guide rail. The slide rail is provided at its ends with screws to be screwed securely to a seat frame. Between the rails there are roller bodies disposed in grooves in the rails. Upside-down U-shaped reinforcing clamps span over the slide rail in the area of the screws to prevent bending out of the U-profile of the slide rail under heavy load.

12 Claims, 1 Drawing Sheet

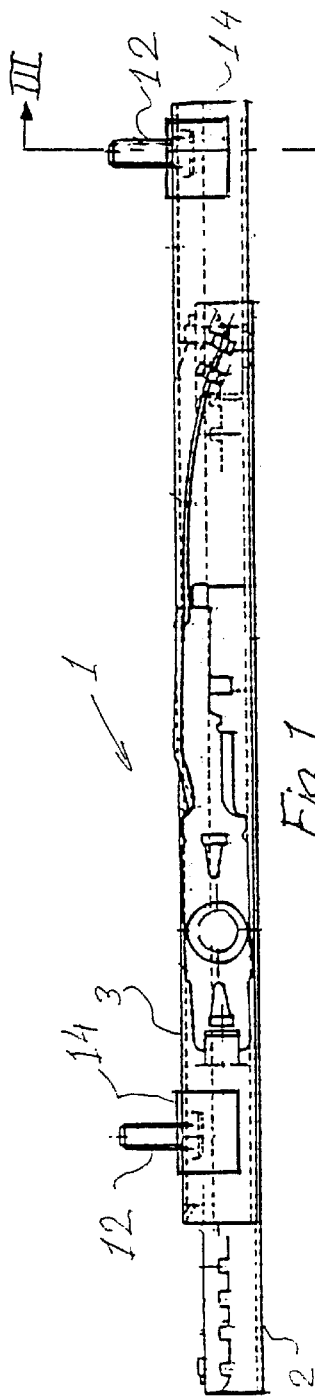
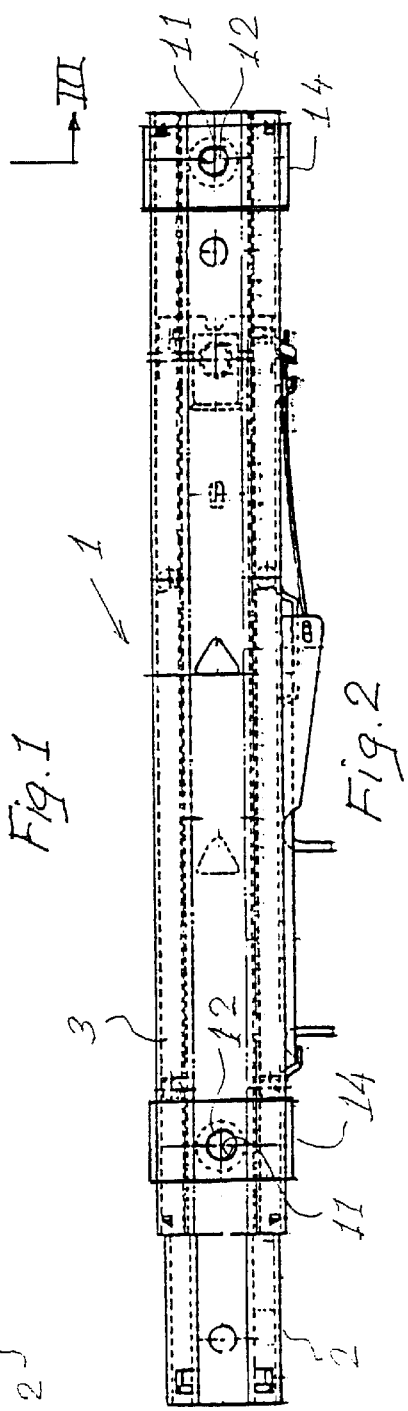
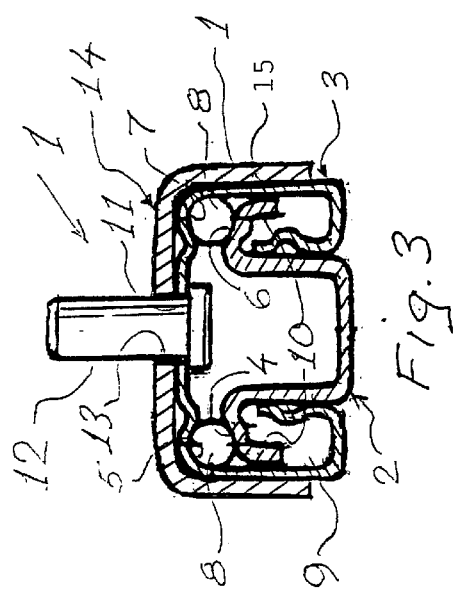

SLIDE RAIL FOR A VEHICLE CHAIR

BACKGROUND OF THE INVENTION

The present invention relates to a slide rail arrangement for a vehicle seat, comprising an elongated guide rail having at least two longitudinal parallel grooves for roller bodies and being arranged to be fixed relative to a vehicle floor, and a slide rail, which has an inverted U-profile, spans over the guide rail and has corresponding facing parallel grooves for the roller bodies as well as fastener members for fixing the slide rail relative to a seat frame.

Slide rail arrangements of this type are used for vehicle seats in practically all types of motor vehicles from light-weight passenger cars to heavy construction machines, and are mass-produced in large numbers in various more or less typical standard designs. It has proved to be the case that after a certain period of use, especially in construction machines and other implements driven on uneven surfaces, that clearance is created between the guide rail and the slide rail. This clearance is in many cases due to the fact that the upside down U-profile of the slide rail is widened somewhat under the load and bending moment which it is subjected to by the weight of the seat and the driver during operation. One method of solving this problem is of course to increase the dimensions of the components in the slide rail arrangement, but in this case it is necessary to deviate from the mass-produced standard designs, and this is an expensive solution, since the volumes involved are substantially smaller for this type of vehicle than for common passenger cars and trucks.

SUMMARY OF THE INVENTION

The purpose of the present invention is to achieve, for a slide rail arrangement of the type described by way of introduction, a simple and inexpensive solution making it possible to use existing slide rail arrangements of standard design, also in vehicles such as constaction machines and the like, and minimize the risk of play arising after a period of use.

This is achieved according to the invention by virtue of the fact that upside down U-shaped reinforcing clamps spanning over the slide rail in the area of at least a plurality of fastening members.

In a commonly occurring slide rail arrangement of the type described, the fastening members are two screws disposed in holes in the slide rail in the vicinity of its two ends. It has been shown that the bending-out of the U-profile occurs in the vicinity of these screws, and by merely arranging short simple reinforcing clamps near these screws, the same result can be achieved as making the entire slide rail heavier. In a simple and inexpensive embodiment, each clamp is made with a bore which fits the fasted screw so that each clamp is merely slipped over the respective screw and is clamped securely to the seat frame when the slide rail is screwed onto it.

BRIEF DESCRIPTION OF THE DRAWINGS

The invention will be described in more detail below with reference to examples shown in the accompanying drawing, where FIG. 1 shows a side view of one embodiment of a slide rail arrangement according to the invention, FIG. 2 shows a plan view of slide rail arrangement of FIG. 1, and FIG. 3 shows a somewhat enlarged section along the line III—III in FIG. 1.

DETAILED DESCRIPTION OF THE PREFERRED EMBODIMENTS

The slide rail arrangement generally designated 1 in the figures, comprises an elongated gated guide rail 2 adapted to be screwed to or otherwise fixed to a vehicle floor or to a member joined to the floor, and a slide rail 3 is intended to be screwed securely to a frame for a vehicle seat. The design of the guide rail 2 and the slide rail 3, and their engagement, are pivously known and will only be described here when of importance to illustrating the invention.

The guide rail 2 has a U-profile shape while the slide rail 3 has an upside down or inverted U-profile. They are furthermore bent so that parallel longitudinal facing grooves 4, 5 and 6, 7, respectively, are formed, which serve as roller tracks for rolling bodies in the form of balls 8. The slide rail 3 has lateral flanges 9, which in cooperation with opposing lateral flanges 10 on the guide rail 2 form lateral guides for the slide rail 3 relative to the guide rail 2. Near its ends, the slide rail 3 is provided with bores 11, in which screws 12 arc disposed and which are intended to join the slide rail 3 to a seat frame (not shown).

The screws 12 extend through the bores 13 in a pair of upside down U-shaped reinforcing clamps 14, which rest loosely on the slide rail 3, but which are clamped securely between it and the seat frame during mounting. In the embodiment shown in FIG. 3, the clamps 14 have a material thickness which is approximately twice that of the material thickness of the slide rail 3. As can be seen in the figures, the lateral flanges 15 of the clamps 14 lie tightly adjacent the outer sides of the side flanges 9. The length of the clamps 14 only needs to be a fraction of the length of the slide rail 3 to achieve the desired function.

The mounting of the slide rails 3 on the seat frame is hardly affected at all by the addition of the reinforcing clamps 14, since these need only be slipped over the screws and then fixed automatically when the slide rails 3 are tightened onto the seat frame.

What is claimed is:

1. A slide rail arrangement for a vehicle seat having a frame, comprising:

an elongated guide rail having first and second longitudinal parallel grooves, said elongated guide rail being arranged for connection to a vehicle floor;

a slide rail, which has an inverted U-profile, spans over the guide rail and has corresponding facing parallel grooves for the roller bodies; and a plurality of fastener members for fixing the slide rail relative to a seat frame.

wherein inverted U-shaped reinforcing clamps span over the slide rail only in the vicinity of the plurality of fastener members.

2. Slide rail arrangement according to claim 1, characterized in that the extent of the reinforcing clamps (14) in the longitudinal direction of the slide rail (3) is only a fraction of the length of the slide rail and that they extend down over a major portion of the side (9) of the slide rail.

3. Slide rail arrangement according to claim 1, characterized in that the reinforcing clamps (14) have a greater material thickness than the slide rail.

4. Slide rail arrangement according to claim 1, characterized in that the fastener members are screws (12) extending from below and upwards trough bores (11) in the slide rail (3) and trough bores (13) in the reinforcing clamps (14), which lie loosely on the slide rail and are arranged to be clamped securely between the slide rail and a seat frame.

5. Slide rail a arrangement according to claim 4, characterized in that a screw (12) and a reinforcing clamp (14) are arranged in the vicinity of each end of the slide rail.

6. The slide rail arrangement according to claim 1, wherein the reinforcing clamps, in a longitudinal direction of the slide rail, extend less than a length of the slide rail.

7. A slide rail arrangement for a vehicle seat comprising:
- an elongated guide rail having first and second longitudinal parallel grooves, said elongated guide rail being structured and arranged for connection to a vehicle floor;
- a plurality of rolling bodies for rolling along said first and second longitudinal parallel grooves;
- a slide rail having an inverted U-shaped profile, and having first and second grooves corresponding to and facing said first and second longitudinal grooves, said slide rail enclosing said elongated guide rail;
- a plurality of fastening members extending through said slide rail for securing said slide rail to a seat frame; and
- a plurality of separate means for reinforcing said slide rail, each means for reinforcing being arranged only in a vicinity of one of said plurality of fastening members, one of said plurality of fastening members extending through each of said plurality of inverted U-shaped reinforcing clamps.

8. The slide rail arrangement as claimed in claim 7, wherein there are only two of said inverted U-shaped reinforcing clamps.

9. The slide rail arrangement as claimed in claim 8, wherein a thickness of said inverted U-shaped reinforcing clamps is greater than a thickness of said slide rail for reinforcing said slider rail at said plurality of fastening members.

10. The slide rail arrangement of claim 7, wherein each said reinforcing lamp is secured between the slide rail and the vehicle seat frame only by one of the plurality of fastening members.

11. The slide rail arrangement of claim 10, wherein each of the reinforcing lamps is in direct contact with the slide rail and the vehicle seat frame.

12. A slide rail arrangement for a vehicle seat, comprising:
- an elongated guide rail having first and second longitudinal parallel grooves, said elongated guide rail being structured and arranged for connection to a vehicle floor;
- a plurality of rolling bodies for rolling along said first and second longitudinal parallel grooves;
- a slide rail having an inverted U-shaped profile, and having first and second grooves corresponding to and facing said first and second longitudinal grooves, said slide rail enclosing said elongated guide rail;
- a plurality of fastening members extending through said slide rail for securing said slide rail to a seat frame; and
- a plurality of separate means for reinforcing said slide rail, each means for reinforcing being arranged only in a vicinity of one of said plurality of fastening members.

* * * * *